US012755227B2

(12) United States Patent
Zhang et al.

(10) Patent No.: US 12,755,227 B2

(45) Date of Patent: Oct. 6, 2026

(54) PROJECT DISASTER WARNING METHOD AND SYSTEM BASED ON COLLABORATIVE FUSION OF MULTI-PHYSICS MONITORING DATA

(71) Applicant: Qingdao University of Technology, Qingdao (CN)

(72) Inventors: Liming Zhang, Qingdao (CN); Zhongyuan Liu, Qingdao (CN); Yu Cong, Qingdao (CN); Xiaoshan Wang, Qingdao (CN); Zaiquan Wang, Qingdao (CN); Fanxiu Chen, Qingdao (CN); Jinfeng Cao, Qingdao (CN)

(73) Assignee: Qingdao University of Technology, Qingdao (CN)

( * ) Notice: Subject to any disclaimer, the term of this patent is extended or adjusted under 35 U.S.C. 154(b) by 880 days.

(21) Appl. No.: 18/091,663

(22) Filed: Dec. 30, 2022

(65) Prior Publication Data

US 2023/0410012 A1 Dec. 21, 2023

(30) Foreign Application Priority Data

Jun. 16, 2022 (CN) ........................ 202210676871.X

(51) Int. Cl.
*G06Q 10/0635* (2023.01)
*G06F 18/25* (2023.01)
(Continued)

(52) U.S. Cl.
CPC ....... *G06Q 10/0635* (2013.01); *G06F 18/251* (2023.01); *G06N 3/0442* (2023.01); *G06N 3/08* (2013.01); *G06Q 50/265* (2013.01)

(58) Field of Classification Search
CPC .............. G06Q 10/0635; G06Q 50/265; G06F 18/251; G06F 18/25; G06F 17/16;
(Continued)

(56) References Cited

FOREIGN PATENT DOCUMENTS

CN 103557884 A * 2/2014
CN 112232396 A * 1/2021 ............. G06N 3/045

OTHER PUBLICATIONS

English machine translation of Zhang et al. (CN-103557884-A) (Year: 2014).*

(Continued)

*Primary Examiner* — Walter L Lindsay, Jr.
*Assistant Examiner* — Geoffrey T Evans
(74) *Attorney, Agent, or Firm* — Dority & Manning, PA

(57) ABSTRACT

A project disaster warning method and system based on collaborative fusion of multi-physical field monitoring data is provided. The method includes: acquiring and preprocessing multi-sensor real-time monitoring data of potentially dangerous parts of a project structure; normalizing multi-physical field monitoring time sequence data to construct a normalized sample matrix; analyzing sensitivities of various physical field monitoring indicators to a safety state of a project by using a multivariate statistical method; guiding initialization training of a LSTM network according to the sensitivities, and obtaining output results of the LSTM network; obtaining basic probability assignments of various warning levels after fusion according to an improved D-S evidence theory based on Chebyshev distance, with the output results of the LSTM network as evidence inputs; determining disaster danger levels of the potentially dangerous parts of the project structure using a basic probability assignment-based decision method.

10 Claims, 4 Drawing Sheets

(51) Int. Cl.
*G06N 3/0442* (2023.01)
*G06N 3/08* (2023.01)
*G06Q 50/26* (2024.01)

(58) Field of Classification Search
CPC ........ G06F 17/18; G06N 3/0442; G06N 3/08; G06N 3/044; Y02A 90/10
See application file for complete search history.

(56) References Cited

OTHER PUBLICATIONS

English machine translation of Geng et al. (CN-112232396-A) (Year: 2021).*

* cited by examiner

PROJECT DISASTER WARNING METHOD AND SYSTEM BASED ON COLLABORATIVE FUSION OF MULTI-PHYSICS MONITORING DATA

CROSS-REFERENCE TO RELATED APPLICATION

This patent application claims the benefit and priority of Chinese Patent Application No. 202210676871.X filed with the China National Intellectual Property Administration on Jun. 16, 2022, the disclosure of which is incorporated by reference herein in its entirety as part of the present application.

TECHNICAL FIELD

The present disclosure relates to the technical field of hydraulic project disaster prevention and control, in particular to a project disaster warning method and system based on collaborative fusion of multi-physical field monitoring data.

BACKGROUND

Hydraulic project disaster monitoring and warning refers to monitoring deformation, micro-seism and other indicators of the overall hydraulic project or potential disaster body through technical means such as strain sensors, optical fiber sensors, osmometers, acoustic emission and remote sensing, warning a threatened area or group of people in advance before the disaster occurs or reaches a critical value of danger.

Responses of different monitoring indicators to the instability process of project structures are not synchronous. A single response indicator or comparative analysis among similar signals has large errors in predicting rock mass destruction, resulting in uniform warning times, and thus intelligent prediction in a full-life cycle cannot be realized. In the field of hydraulic project, there is not an effective warning technology based on fusion of signals with multiple physical attributes. A more ideal disaster warning technology is to establish, through project diagnosis and data intelligent fusion, a warning method based on collaborative fusion of multivariate monitoring data, which allows intelligent perception and collaborative fusion of multivariate service monitoring information, feature extraction and identification of multi-dimensional performance data, parallel-driven multi-dimensional service inversion, full-time service fusion deduction and time-variant prediction.

Data fusion is a technology that automatically analyzes and comprehensively processes multi-physical field information according to time sequence and criteria to reach conclusions or decisions, including multi-sensor and multi-information input, synthesis rules, representations, etc. At present, data fusion technology is widely used in the fields of aerospace, autonomous driving, and artificial intelligence. The application in warning of project damage has just started, and unified fusion rules and effective fusion algorithms have not been established, and there is no mature warning technology based on fusion of signals with different physical attributes. It is desired to propose an effective multi-physical field data fusion method directed to the field of hydraulic project, to improve the warning accuracy of project damage, and achieve the intelligent prediction in the full-life cycle and based on multivariate perception and collaborative fusion, which is used for time-variant prediction of a project.

SUMMARY

An objective of some embodiments is to provide a project disaster warning method and system based on collaborative fusion of multi-physical field monitoring data, so as to improve accuracy of project disaster warning.

For achieving the above objective, the present disclosure provides the following solutions.

A project disaster warning method using collaborative fusion of multi-physical field monitoring data, comprising:

- acquiring and preprocessing multi-sensor real-time monitoring data of potentially dangerous parts of a project structure to obtain multi-physical field monitoring time sequence data;
- performing normalization processing on the multi-physical field monitoring time sequence data to construct a normalized sample matrix;
- analyzing sensitivities of various physical field monitoring indicators to a safety state of a project according to the normalized sample matrix, by using a multivariate statistical method;
- guiding initialization training of a long short-term memory (LSTM) network according to the sensitivities of various physical field monitoring indicators to the safety state of the project, and obtaining output results of the LSTM network through a trained LSTM network;
- obtaining basic probability assignments of various warning levels after fusion according to an improved D-S evidence theory based on Chebyshev distance, with the output results of the LSTM network as evidence inputs;
- determining, disaster danger levels of the potentially dangerous parts of the project structure according to the basic probability assignments of various warning levels after fusion, by using a basic probability assignment-based decision method.

Optionally, the acquiring and preprocessing multi-sensor real-time monitoring data of potentially dangerous parts of a project structure to obtain multi-physical field monitoring time sequence data comprises:

- acquiring the multi-sensor real-time monitoring data of the potentially dangerous parts of the project structure, wherein the multi-sensor real-time monitoring data is real-time monitoring data collected in time sequence by two or more of a strain sensor, a displacement sensor, a stress sensor, a wave velocity sensor, an osmotic pressure sensor, a temperature sensor, an acoustic emission sensor and an electromagnetic radiation sensor;
- preprocessing the multi-sensor real-time monitoring data by wavelet analysis or mean value fitting method to remove abnormal or noise data and obtain the multi-physical field monitoring time sequence data.

Optionally, the performing normalization processing on the multi-physical field monitoring time sequence data to construct a normalized sample matrix comprises:

- establishing a sample data matrix $X^*$ according to the multi-physical field monitoring time sequence data, wherein various data columns $X^*_i$ in the sample data matrix $X^*$ correspond to respective physical field monitoring indicators i collected by different sensors; the physical field monitoring indicators i include strain, displacement, stress, wave velocity, osmotic pressure, temperature, acoustic emission, electromagnetic radiation;
- performing normalization conversion on various data columns $X^*_i$ in the sample data matrix $X^*$ to obtain the normalized sample matrix X, wherein various data columns $X_i$ in the normalized sample matrix X correspond to different physical field monitoring indicators i.

Optionally, the analyzing, sensitivities of various physical field monitoring indicators to a safety state of a project according to the normalized sample matrix, by using a multivariate statistical method, comprises:

calculating a correlation coefficient matrix R according to the normalized sample matrix X;

calculating p non-negative characteristic roots $\{\lambda_1, \lambda_2, \ldots, \lambda_p\}$ according to the correlation coefficient matrix R, wherein p is a number of physical field monitoring indicators i;

determining cumulative contribution degrees $W_q$ of first q common factors among p common factors according to the p non-negative characteristic roots $\{\lambda_1, \lambda_2, \ldots, \lambda_p\}$;

selecting main common factors $F_q$ which reflect a safety state of the project structure according to a principle that the cumulative contribution degrees $W_q$ are not less than 85%, and constructing a common factor matrix F;

calculating a factor load matrix A according to the common factor matrix F;

calculating weights $T_i$ of various physical field monitoring indicators i in all main common factors according to the factor load matrix A;

calculating final weights $\tau_i$ of various physical field monitoring indicators i according to the cumulative contribution degrees $W_q$ and the weights $T_i$ corresponding to various physical field monitoring indicators i, wherein the final weights $\tau_i$ reflect the sensitivities of various physical field monitoring indicators i to the safety state of the project.

Optionally, the guiding initialization training of a LSTM network according to the sensitivities of various physical field monitoring indicators to the safety state of the project, and obtaining output results of the LSTM network through a trained LSTM network comprises:

training the LSTM network with the sensitivities $\tau_i$ of various physical field monitoring indicators i to the safety state of the project as initialization weights of the LSTM network and the normalized sample matrix corresponding to various physical field monitoring indicators i as a sample set, by using a sigmoid function as a network activation function, to obtain the trained LSTM network;

performing feature-level fusion through the trained LSTM network to obtain the output results of the LSTM network.

Optionally, the obtaining, basic probability assignments of respective warning levels after fusion according to an improved D-S evidence theory based on Chebyshev distance, with the output results of the LSTM network as evidence inputs, comprises:

calculating, with the output results of the LSTM network as basic probability assignments of warning levels of various evidence bodies, a Chebyshev distance $d_{BPA}(m_i,m_j)$ between an evidence body $m_i$ and an evidence body $m_j$;

calculating a new conflict coefficient k' between the evidence body $m_i$ and the evidence body m; according to the Chebyshev distance $d_{BPA}(m_i,m_j)$;

obtaining basic probability assignments m(A), m(B) and m(C) of various warning levels after fusion based on the new conflict coefficient k', according to the improved D-S evidence theory based on the Chebyshev distance, wherein the various warning levels include a stable period, a development period and an alarm period; m(A), m(B) and m(C) are basic probability assignments of the stable period, the development period and the alarm period, respectively.

A project disaster warning system based on collaborative fusion of multi-physical field monitoring data, comprising:

a data acquisition and preprocessing module configured to acquire and preprocess multi-sensor real-time monitoring data of potentially dangerous parts of a project structure to obtain multi-physical field monitoring time sequence data;

a normalization processing module configured to perform normalization processing on the multi-physical field monitoring time sequence data to construct a normalized sample matrix;

a multi-physical field data-level fusion module configured to analyze, sensitivities of various physical field monitoring indicators to a safety state of a project according to the normalized sample matrix, by using a multivariate statistical method;

a multi-physical field feature-level fusion module configured to guide initialization training of a LSTM network according to the sensitivities of various physical field monitoring indicators to the safety state of the project, and obtain output results of the LSTM network through a trained LSTM network;

a multi-physical field data decision fusion module configured to obtain basic probability assignments of respective warning levels after fusion according to an improved D-S evidence theory based on Chebyshev distance, with the output results of the LSTM network as evidence inputs;

a disaster danger level evaluation module configured to determine, disaster danger levels of the potentially dangerous parts of the project structure according to the basic probability assignments of various warning levels after fusion, by using a basic probability assignment-based decision method.

Optionally, the data acquisition and preprocessing module comprises:

a data acquisition unit configured to acquire the multi-sensor real-time monitoring data of the potentially dangerous parts of the project structure, wherein the multi-sensor real-time monitoring data is real-time monitoring data collected in time sequence by two or more of a strain sensor, a displacement sensor, a stress sensor, a wave velocity sensor, an osmotic pressure sensor, a temperature sensor, an acoustic emission sensor and an electromagnetic radiation sensor;

a data preprocessing unit configured to preprocess the multi-sensor real-time monitoring data by wavelet analysis or mean value fitting method to remove abnormal or noise data, and obtain the multi-physical field monitoring time sequence data.

Optionally, the normalization processing module comprises:

a sample data matrix establishment unit configured to establish a sample data matrix X* according to the multi-physical field monitoring time sequence data, wherein various data columns $X^*_i$ in the sample data matrix X* correspond to various physical field monitoring indicators i collected by different sensors; the physical field monitoring indicators i include strain, displacement, stress, wave velocity, osmotic pressure, temperature, acoustic emission, electromagnetic radiation;

a normalization conversion unit configured to perform normalization conversion on various data columns $X^*_i$ in the sample data matrix X* to obtain the normalized sample matrix X, wherein various data columns $X_i$ in the normalized sample matrix X correspond to various physical field monitoring indicators i.

Optionally, the multi-physical field data-level fusion module comprises:

a correlation coefficient matrix calculation unit configured to calculate a correlation coefficient matrix R according to the normalized sample matrix X;

a non-negative characteristic root calculation unit configured to calculate p non-negative characteristic roots $\{\lambda_1, \lambda_2, \ldots, \lambda_p\}$ according to the correlation coefficient matrix R, wherein p is a number of physical field monitoring indicators i;

a cumulative contribution degree calculation unit configured to determine cumulative contribution degrees $W_q$ of first q common factors among p common factors according to the p non-negative characteristic roots $\{\lambda_1, \lambda_2, \ldots, \lambda_p\}$;

a main common factor selection unit configured to select main common factors $F_q$ which reflect a safety state of the project structure according to a principle that the cumulative contribution degrees $W_q$ are not less than 85%, and construct a common factor matrix F;

a factor load matrix calculation unit configured to calculate a factor load matrix A according to the common factor matrix F;

a weight calculation unit configured to calculate weights $T_i$ of various physical field monitoring indicators i in all main common factors according to the factor load matrix A;

a final weight calculation unit configured to calculate final weights $\tau_i$ of various physical field monitoring indicators i according to the cumulative contribution degree $W_q$ and the weights $T_i$ corresponding to various physical field monitoring indicators i, wherein the final weights $\tau_i$ reflect the sensitivities of various physical field monitoring indicators i to the safety state of the project.

According to specific embodiments of the present disclosure, the present disclosure discloses the following technical effects.

The present disclosure provides a project disaster warning method and system using collaborative fusion of multi-physical field monitoring data. The method includes: acquiring and preprocessing multi-sensor real-time monitoring data of potentially dangerous parts of a project structure to obtain multi-physical field monitoring time sequence data; performing normalization processing on the multi-physical field monitoring time sequence data to construct a normalized sample matrix; analyzing, sensitivities of various physical field monitoring indicators to a safety state of a project according to the normalized sample matrix, by using a multivariate statistical method; guiding initialization training of a LSTM network according to the sensitivities of various physical field monitoring indicators to the safety state of the project, and obtaining output results of the LSTM network through a trained LSTM network; obtaining basic probability assignments of various warning levels after fusion according to an improved D-S evidence theory based on Chebyshev distance, with the output results of the LSTM network as evidence inputs; determining disaster danger levels of the potentially dangerous parts of the project structure according to the basic probability assignments of various warning levels after fusion, by using a basic probability assignment-based decision method. The method and system of the present disclosure can improve the accuracy of project disaster warning.

BRIEF DESCRIPTION OF THE DRAWINGS

To describe the technical solutions in the embodiments of the present disclosure or in the prior art more clearly, the following briefly describes the drawings required for describing the embodiments. Apparently, the drawings in the following description are merely some embodiments of the present disclosure, and those of ordinary skill in the art may still derive other drawings from these drawings without creative efforts.

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the scope of protection of the present disclosure.

An objective of some embodiments of the present disclosure is to provide a project disaster warning method and system based on collaborative fusion of multi-physical field monitoring data, so as to improve the accuracy of project disaster warning.

In order to make the above objectives, features and advantages of the present disclosure more clearly understood, the present disclosure will be described in further detail below with reference to the accompanying drawings and detailed description of the embodiments.

Figure 1:
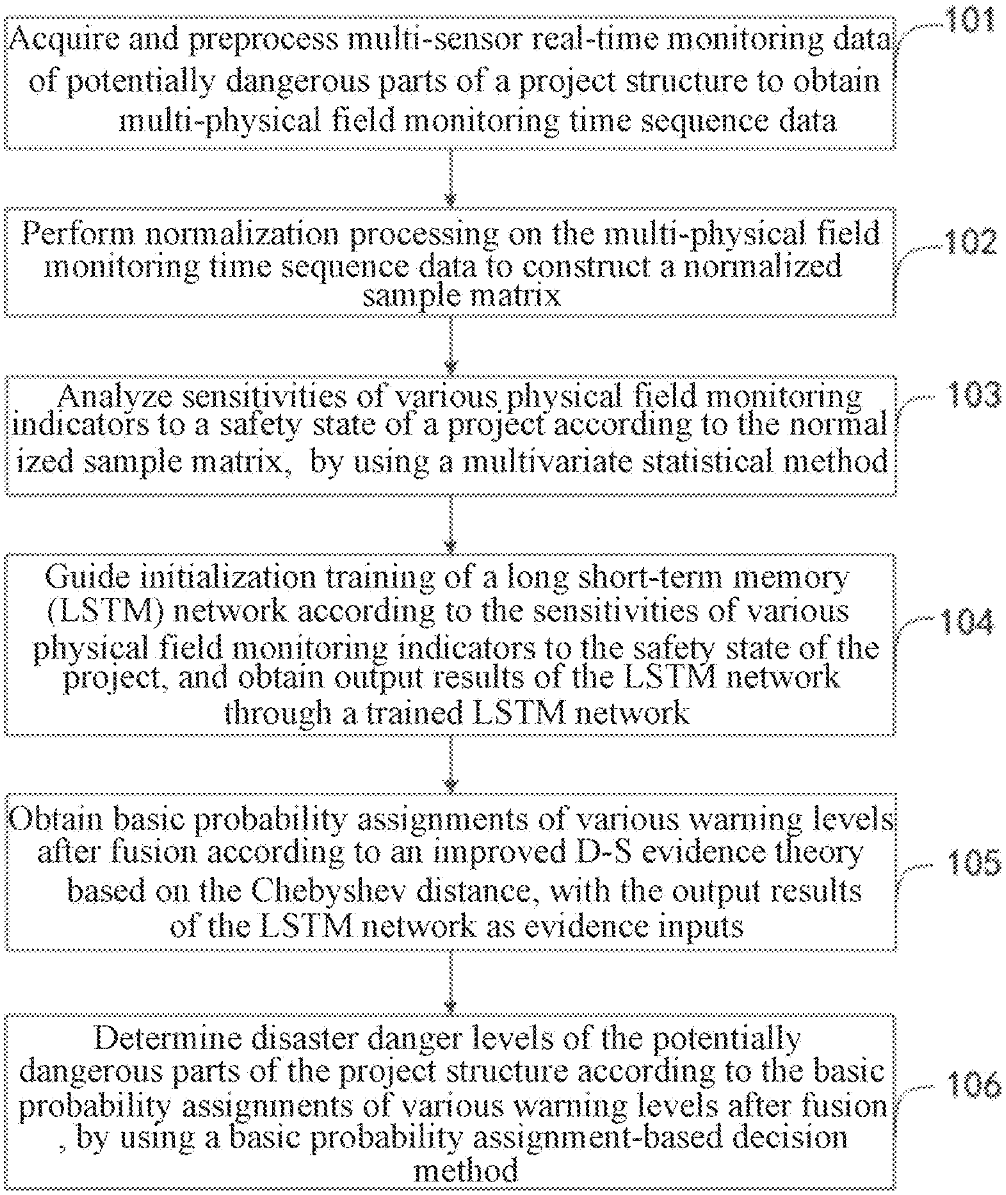
FIG. 1 is a flowchart of a project disaster warning method based on collaborative fusion of multi-physical field monitoring data according to the present disclosure.
Figure 2:
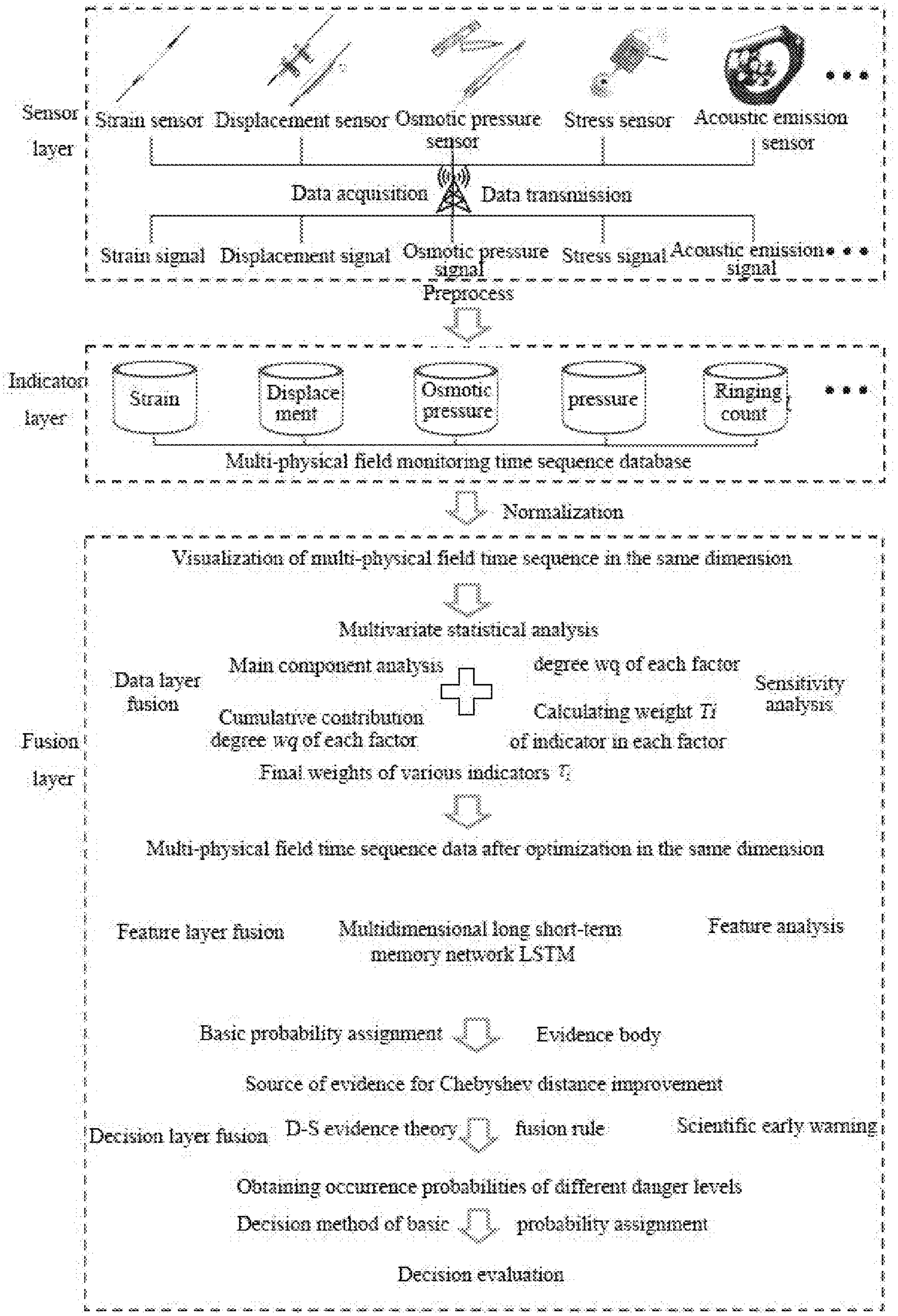
FIG. 2 is a schematic diagram of the principle of a project disaster warning architecture based on collaborative fusion of multi-physical field monitoring data according to the present disclosure.

FIG. 1 is a flowchart of a project disaster warning method based on collaborative fusion of multi-physical field monitoring data according to the present disclosure. FIG. 2 is a schematic diagram of the principle of a project disaster warning architecture based on collaborative fusion of multi-physical field monitoring data according to the present disclosure. Referring to FIG. 2, the project disaster warning architecture based on collaborative fusion of multi-physical field monitoring data according to the present disclosure includes a sensor layer, an indicator layer and a fusion layer. For the sensor layer, according to technical specification requirements or expert review schemes, monitoring means such as strain, displacement, osmotic pressure, stress, and acoustic emission sensors are provided at potentially dangerous parts of a project structure, for example, different positions of a tunnel, so as to collect data of each monitoring sensor in real time, and transmit the data to the indicator layer. The indicator layer acquires tunnel monitoring sensor data in real time, and preprocesses the acquired data by using methods such as wavelet analysis or mean value fitting, to remove abnormal or noise data and obtain relatively smooth multi-physical field monitoring time sequence data, thereby establishing a multi-physical field monitoring time sequence database. Normalization processing is performed on multi-physical field time sequence data of tunnel destruction, so as to eliminate a dimension difference among multivariate data. The fusion layer performs sensitivity analysis on multivariate monitoring data of rock mass destruction based on a multivariate statistical analysis method, selects main information of the rock mass destruction to construct a risk assessment indicator system, and eliminates the influence of redundant information and overlapping information among multivariate monitoring data on tunnel safety risk evaluation. A multi-dimensional LSTM network is constructed, so as to perform feature analysis and recognition on multi-physical field data and obtain a basic probability assignment of each evidence body, thereby overcoming the problem of constructing a basic probability assignment function by means of an evidence theory. The improved D-S evidence theory based on a Chebyshev distance solves the problem of decision errors caused by high-conflict evidence, realizes a decision based on the fusion of multiple evidence bodies, and overcomes the problem of inconsistent warning times in case of single response indicator, and thus scientific warning is realized.

Referring to FIG. 1, the project disaster warning method based on collaborative fusion of multi-physical field monitoring data according to the present disclosure includes the following steps 1 to 6.

In step 1, multi-sensor real-time monitoring data of potentially dangerous parts of a project structure are acquired and preprocessed to obtain multi-physical field monitoring time sequence data.

In step 1, multi-sensor real-time monitoring data is acquired and preprocessed, and a multi-physical field monitoring time sequence database is established. The multi-physical field monitoring time sequence data (simply referred to as time sequence data) in the present disclosure may be data monitored by multiple sensors in similar material failure tests or data monitored in hydraulic project site. The multi-physical field monitoring time sequence data includes real-time monitoring data being a combination of two or more of displacement, strain, stress, wave velocity, osmotic pressure, temperature, acoustic emission, and electromagnetic radiation.

First, according to the technical specifications and the expert review scheme, strain, displacement, stress, wave velocity, osmotic pressure, temperature, acoustic emission, electromagnetic radiation sensor and other sensors are arranged in potentially dangerous parts of the project structure, such as potential landslide parts, fragile rock masses, bridges, and stress concentration areas of building structures, etc., so as to collect the monitoring data of each physical field in real time as real-time monitoring data, and store the data in a time sequence. The real-time monitoring data after obtained by displacement, strain sensor and other sensors, are subjected to preprocessing though methods such as wavelet analysis or mean value fitting to remove abnormal or noise data, and obtain relatively smooth multi-physical monitoring time sequence data, thereby establishing multi-physical monitoring time sequence database.

Therefore, in step 1, multi-sensor real-time monitoring data of potentially dangerous parts of the project structure is acquired and preprocessed to obtain multi-physical field monitoring time sequence data, which specifically includes the following steps 1.1 to 1.2.

In step 1.1, multi-sensor real-time monitoring data of potentially dangerous parts of the project structure is acquired. The multi-sensor real-time monitoring data is real-time monitoring data acquired by two or more of a strain sensor, a displacement sensor, a stress sensor, a wave velocity sensor, an osmotic pressure sensor, a temperature sensor, an acoustic emission sensor and an electromagnetic radiation sensor according to a time sequence.

In step 1.2, the multi-sensor real-time monitoring data is preprocessed by wavelet analysis or mean value fitting method to remove abnormal or noise data, and obtain the multi-physical field monitoring time sequence data.

In step 2, the multi-physical field monitoring time sequence data is normalized to construct a normalized sample matrix.

In step 2, the multi-physical field monitoring time sequence data is normalized and converted into a dimensionless scalar, which facilitates comparison among indicators of different units and different magnitudes. The multi-physical field monitoring time sequence data are formed into a matrix {displacement, strain, stress, wave velocity, osmotic pressure, temperature, acoustic emission, electromagnetic radiation . . . }, and data in the matrix are arranged according to respective time coordinates, so as to establish a sample data matrix. Various columns of data in the sample data matrix are subjected to normalization conversion, so as to eliminate dimensional difference among multivariate monitoring parameters.

In step 2, the multi-physical field monitoring time sequence data are normalized to construct a normalized sample matrix, which includes the following steps 2.1 to 2.2.

In step 2.1, the multi-physical field monitoring time sequence data is formed into a sample data matrix $X^*=\{X^*_1, X^*_2, \ldots, X^*_p\}$ according to order of different physical field monitoring indicators i∈{strain, displacement, stress, wave velocity, osmotic pressure, temperature, acoustic emission, electromagnetic radiation . . . }. Various data columns $x^*_i$ in the sample data matrix X* correspond to different physical field monitoring indicators i collected by different sensors. The physical field monitoring indicators i include strain, displacement, stress, wave velocity, osmotic pressure, temperature, acoustic emission, and electromagnetic radiation. P is a number of physical field monitoring indicators.

In step 2.2, normalization conversion is performed on various data columns $x^*_i$ in the sample data matrix X* by using the following formula (1) to obtain a normalized sample matrix X:

$$x_{ki} = \frac{x^*_{ki} - x^*_{imin}}{x^*_{imax} - x^*_{imin}}, \tag{1}$$

where k is a serial number of a data column, that is, $x^*_{ki}$ represents data value of a k-th time sequence data in a i-th column of the sample data matrix X*; $x_{ki}$ is normalized function value of the time sequence data $x^*_{ki}$, and also the k-th time sequence data of the i-th column constituting the normalized sample matrix X. A value domain of the i-th data column is $x^*_{imin}$ and re the minimum and maximum values of the i-th data column $x^*_i$ in the sample data matrix X*, respectively. Respective data columns $X_i$ in the normalized sample matrix X represent respective physical field monitoring indicators (simply referred to as indicators or monitoring indicators) i.

In step 3, according to the normalized sample matrix, sensitivities of various physical field monitoring indicators to the safety state of the project are analyzed by using a multivariate statistical method.

In step 3, sensitivity of precursor information of each physical field monitoring data is analyzed, so as to realize data-level fusion of multi-physical field. The intrinsic relation of the physical field data from different types of sensors in the step 2 is mined mainly through a multivariate statistical analysis (MSA) method, the sensitivity of each indicator characterizing rock mass destruction is analyzed, the main physical monitoring reflecting project disasters are selected, and a risk assessment indicator system is constructed. Thus, data level fusion of multi-physical field is realized.

In the step 3, sensitivities of various physical field monitoring indicators to the safety state of the project are analyzed by using a multivariate statistical method according to the normalized sample matrix, which includes the following steps 3.1 to 3.7.

In step 3.1, the correlation coefficient matrix R is calculated according to the normalized sample matrix X.

The correlation coefficient matrix R and correlation coefficient $r_{ij}$ are calculated from the normalized sample matrix X, and the formula is:

$$R=(r_{ij})_{p\times p}=\frac{\sum_{k=1}^{n}(x_{ki}-\overline{x}_i)(x_{kj}-\overline{x}_j)}{\sqrt{\sum_{k=1}^{n}(x_{ki}-\overline{x}_i)^2(x_{kj}-\overline{x}_j)^2}} \tag{2}$$

where p is a number of indicators; $r_{ij}$ is the correlation coefficient between two data columns $X_i$ and $X_j$ corresponding to different monitoring indicators i and j; i,j=1, 2, 3, . . . , p, and $r_{ij}=r_{ji}$; $\overline{x}_i$ and $\overline{x}_j$ are average values of different data columns $X_i$ and $X_j$, respectively; $x_{ki}$ and $x_{kj}$ are data values of the k-th data in two data columns $X_i$ and $X_j$, respectively; k=1, 2, 3, . . . , n, n is a number of data contained in each data column $X_i$ in the normalized sample matrix X.

Since various data columns in the normalized sample matrix X represent different monitoring indicators, the correlation coefficients $r_{ij}$ among various indicators are obtained here.

In step 3.2, p non-negative characteristic roots $\{\lambda_1, \lambda_2, \ldots, \lambda_p\}$ are calculated according to the correlation coefficient matrix R.

P non-negative characteristic roots $\{\lambda_1, \lambda_2, \ldots, \lambda_p\}$ are calculated by the following characteristic equation (3):

$$|\lambda_i E-R|=0, \tag{3}$$

where E is a unit matrix; R is the correlation coefficient matrix; $\lambda_i$ is a non-negative characteristic root of each monitoring indicator i; i=1, 2, 3, . . . , p.

In step 3.3, cumulative contribution degree $W_q$ of the first q common factors in p common factors is determined according to the p non-negative characteristic roots $\{\lambda_1, \lambda_2, \ldots, \lambda_p\}$.

The common factor $F_g=I_1X_1+I_2X_2+\ldots I_gX_g$ i is calculated by calculating corresponding feature vectors $\{I_1, I_2, \ldots, I_p\}$ according to a size order in $\{\lambda_1, \lambda_2, \ldots, \lambda_p\}$, where g=1, 2, 3, . . . , p, $F_g$ is the g-th common factor, and a total of p common factors are obtained. $I_g$ is the g-th feature vector in the feature vectors $\{I_1, I_2, \ldots, I_p\}$, and $X_g$ is the g-th data column in the normalized sample matrix X.

The cumulative contribution degree of the first q common factors is determined by formula (4):

$$W_q=\frac{\sum_{i=1}^{q}\lambda_i}{\sum_{i=1}^{p}\lambda_i}\geq 85\%, \tag{4}$$

where q is a number of characteristic values that determine common factor information, that is, a number of main common factors; p is a number of indicators.

In step 3.4, according to the principle that the cumulative contribution degree $W_q$ is not less than 85%, the main common factors $F_q$ that reflect the safety state of the project structure are selected, and a common factor matrix F is constructed.

The cumulative contribution degree of the factors is characterized by the magnitude $W_q$ of the characteristic roots, $\lambda_i$ and according to the principle that the cumulative contribution degree is not less than 85%, the main common factors that reflect the safety state of the project structure are selected, and a common factor matrix $F=(F_1, F_2, \ldots, F_q)'$ is constructed, where ( )' represents a transposed matrix of the matrix in ( ).

In step 3.5, a factor load matrix A is calculated according to the common factor matrix F.

Let a factor model X=AF+ε, and $F=(F_1, F_2, \ldots, F_q)$ be a common factor matrix, the common factor matrix F is orthogonally rotated. Let Z=Γ'F (Γ' is an arbitrary m-order orthogonal matrix), then:

$$X=A\Gamma Z+\varepsilon. \tag{5}$$

The varimax orthogonal rotation is used to make variance of AΓ reach the maximum deterministic factor variant, so as to obtain the factor load matrix A:

$$A=(\sqrt{\lambda_1}I_1, \sqrt{\lambda_2}I_2, \ldots \sqrt{\lambda_q}I_q)=(\theta_1, \theta_2, \ldots, \theta_q), \tag{6}$$

Where Γ is the inverse matrix of Γ', and ε is the error term.

In step 3.6, weight of each physical field monitoring indicator i in all main common factors is calculated according to the factor load matrix A.

The weight $T_i$ of each indicator i in the factors is:

$$T_i=\frac{|\theta_i|}{\sum_{i=1}^{q}|\theta_i|}\quad i=1, 2, \ldots, q, \tag{7}$$

where $T_i$ represents the weight of the indicator i in all main common factors, and $|\theta_i|$ represents the absolute value of the i-th indicator factor loading $\theta_i$.

In step 3.7, the cumulative contribution degree $W_q$ corresponding to each physical field monitoring indicator i is multiplied by the weight $T_i$ to calculate the final weight $\tau_i$ of each physical field monitoring indicator i; the final weight $\tau_i$ reflects the sensitivity of each physical field monitoring indicator to the safety state of the project. The greater the weight $\tau_i$ is, the higher the sensitivity f the monitoring indicator i to the occurrence of disasters is.

With the weight $\tau_i$ of each indicator as the sensitivity standard to reflect the safety state of the project, main physical monitoring s reflecting project disasters are selected, to construct a risk assessment indicator system.

In step 3, the principal component analysis method is used to process the multi-physical monitoring data, so as to eliminate redundant information among multivariate information, and obtain the contribution degree of each parameter after normalization. By the factor analysis method, the internal relationship between physical parameters is analyzed, to mine potential parameters or factors, and the sensitivities of precursor information of various physical parameters are distinguished, to select the main monitoring indicators or main common factors that reflect the safety state of the project, thereby realizing data-level fusion of multi-physical field monitoring parameters.

In step 4, initialization training of long short-term memory network is guided according to the sensitivities of various physical field monitoring indicators to the safety state of the project, and output results from a long short-term memory network are obtained through a trained long short-term memory network.

In step 4, the initialization of the long short-term memory (LSTM) network is guided according to the sensitivities of respective indicators in the step 3, and feature-level fusion is performed through the multi-dimensional LSTM network to preliminarily determine the safety state of the project structure.

There is a highly nonlinear relationship between the deformation process of project structures and the multi-physical field time sequence data. The LSTM network is a temporal recurrent network with strong nonlinear feature mining ability. The sensitivity of each physical field parameter obtained in step 3 guide the LSTM network to initialize weights of variables, and the weights are used as the input source of LSTM for training. The number of units in the input layer is the number of sensor types, and the feature information of each physical field is extracted for feature layer fusion, so as to preliminarily determine the safety state of the project.

In the step 4, initialization training of the LSTM network is guided according to the sensitivities of various physical field monitoring indicators to the safety state of the project, and output results of the LSTM network are obtained through a trained LSTM network, which specifically includes the following steps 4.1 to 4.2.

In step 4.1, the LSTM network is trained with the sensitivities of various physical field monitoring indicators to the safety state of the project as initialization weights of the LSTM network and the normalized sample matrix corresponding to various physical field monitoring indicators as a sample set, by using the sigmoid function as a network activation function, so as to obtain the trained LSTM network.

The weights $\tau_i$ of various indicators calculated in step 3 are used as the sensitivities of various monitoring indicators to reflect the safety state of the project, to guide the LSTM to initialize the initial input source of LSTM, which are the time sequence data monitored by various indicators. The weights $\tau_i$ are the initialization weights of the network, and assign various indicators with respective importance degrees for training. Then, features of various monitoring data are extracted, and the basic probabilities of various evidence bodies of the following D-S theory are output for fusion.

Figure 3:
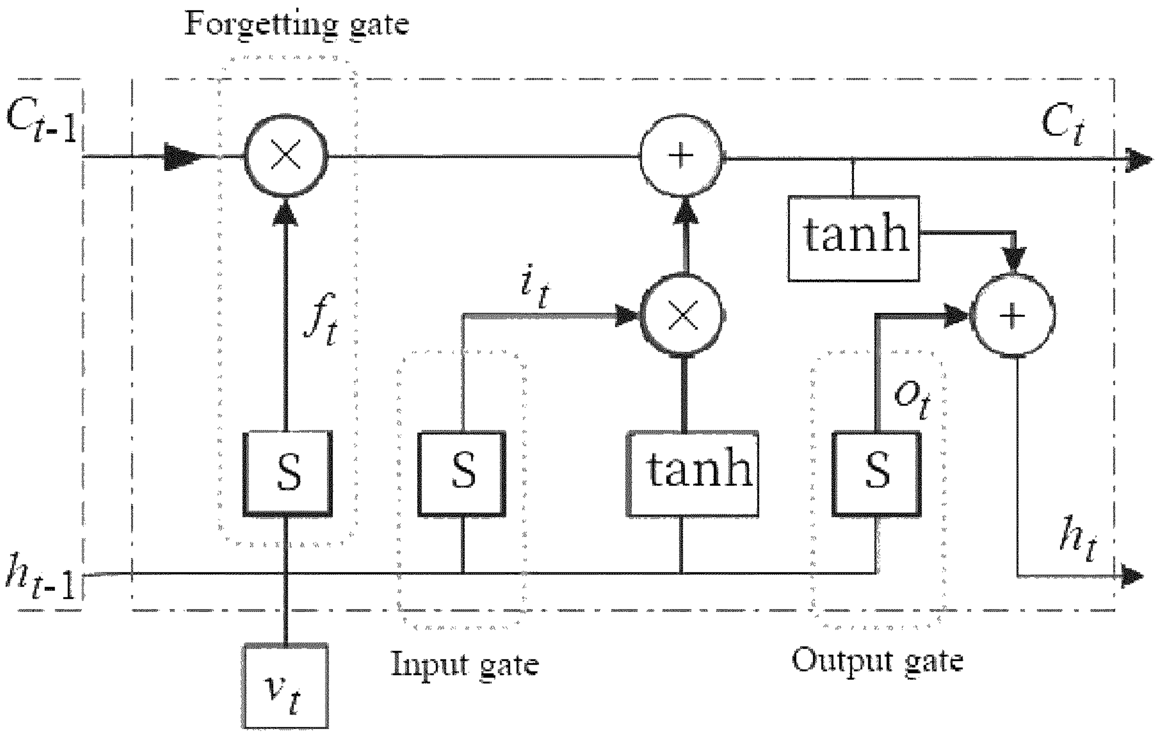
FIG. 3 is a schematic structural diagram of a single long short-term memory network (LSTM) according to the present disclosure.

A single LSTM network structure is shown in FIG. 3. $C_t$ represents the current unit state, which is regulated by three different gates: forget gate $f_t$, input gate $i_t$ and output gate $o_t$. $h_t$ represents the state of a hidden layer, $v_t$ represents the current input, S represents the sigmoid function, ⊗ represents point-by-point multiplication, and ⊕ represents point-by-point addition. The subscript t represents the current moment, and the subscript t−1 represents the previous moment. $h_{t-1}$ represents a state of the hidden layer at the previous moment, $C_{t-1}$ represents a unit state at the previous moment. tan h represents a hyperbolic tangent function.

The normalized data matrix corresponding to each monitoring indicator (main common factor) selected in step 3 is used as a sample set to train the LSTM network, and the sigmoid function is used as an activation function, and the formula is as follows:

$$S=\frac{1}{1+e^{-x}}. \tag{8}$$

The values of the current unit state and the hidden layer state are calculated by the formula (9):

$$\begin{cases} f_t = S(W_f[h_{t-1}, v_t] + b_f) \\ i_t = S(W_i[h_{t-1}, v_t] + b_i) \\ L_t = \tanh(W_C[h_{t-1}, v_t] + b_C) \\ C_t = f_t \otimes C_{t-1} \oplus i_t \otimes L_t \\ o_t = S(W_o[h_{t-1}, v_t] + b_o) \\ h_t = o_t \otimes \tanh(C_t) \end{cases}, \tag{9}$$

Where $W_f$, $W_i$, $W_C$ and $W_o$ represent the weight indicators corresponding to the forget gate $f_t$, input gate $i_t$, unit state $C_t$ and output gate $o_t$ at the current moment, respectively. $b_f$, $b_i$, $b_C$ and $b_o$ represent deviation vectors corresponding to the forget gate $f_t$, input gate $i_t$, current unit state $C_t$ and output gate $o_t$ at the current moment, respectively. $h_t$ and $h_{t-1}$ represent the states of the hidden layer at the current moment and the previous moment, respectively. $v_t$ represent the current input, and S represent a sigmoid function. $C_t$ and $C_{t-1}$ represent the unit states at the current moment and the previous moment, respectively. ⊗ represents point-by-point multiplication, and ⊕ represents point-by-point addition. $L_t$ is an intermediate parameter in the calculation process.

The mean square error MSE of data samples is used to determine quality of LSTM network performance. The smaller the error value is, the better the fusion result of the training network is.

$$MSE=\frac{1}{N}\sum_{i=1}^{N}\left(y_r^{(i)}-y_p^{(i)}\right)^2, \tag{10}$$

Where N is the number of training samples, $$y_r^{(i)}$$

is an actual output value of the i-th sample in the test set, and $$y_p^{(i)}$$

is the output value from the trained network with the i-th sample in the test set passing through it.

In step 4.2, feature-level fusion is performed through a trained LSTM network to obtain output results of LSTM network.

The number of neurons in an output layer of LSTM network is determined according to the number of safety evaluation levels of a recognition framework Φ={A, B, C}, so the number of neurons in the output layer of LSTM is set to 3. In the present disclosure, the output of LSTM is defined in a binary form, and the definition of the output results of LSTM is shown in Table 1.

TABLE 1

Definition of LSTM output layer

| Warning level | Stable period | Development period | Warning period |
|---|---|---|---|
| Output results of LSTM | (1, 0, 0) | (0, 1, 0) | (0, 0, 1) |

The output results of LSTM are deemed as the basic probability assignments of warning levels of various evidence body, as shown in Table 2.

TABLE 2

Summary of basic probability assignments

| Evidence body | Acoustic emission | Strain field | Displacement |
|---|---|---|---|
| Basic probability assignment | $m_1(A)$<br>$m_1(B)$<br>$m_1(C)$ | $m_2(A)$<br>$m_2(B)$<br>$m_2(C)$ | $m_3(A)$<br>$m_3(B)$<br>$m_3(C)$ |

In step 5, with the output results of LSTM network as evidence inputs, basic probability assignments of various warning levels after fusion are obtained according to the improved D-S evidence theory based on the Chebyshev distance.

In step 5, based on the improved D-S evidence theory based on the Chebyshev distance, a conflict coefficient is corrected. With the output results in step 4 as evidence inputs, the basic probability assignments of warning levels for multi-physical field are fused, and the basic probability assignments m(A), m(B) and m(C) of the predicted results after fusion are obtained as occurrence probabilities of different danger levels.

In step 5, with the output results of LSTM network as evidence inputs, the basic probability assignments of various warning levels after fusion are obtained according to the improved D-S evidence theory based on the Chebyshev distance, which includes the following steps 5.1 to 5.3.

In step 5.1, with the output results of LSTM network as the basic probability assignments of the warning levels of various evidence bodies, the Chebyshev distance $d_{BPA}(m_i, m_j)$ between the evidence body $m_i$ and the evidence body $m_j$ is calculated.

The present disclosure introduces the Chebyshev Distance to represent conflict degree between evidences, so as correct evidences with high conflict. The output results of LSTM network in step 4 are converted into evidence inputs of the D-S evidence theory, to overcome difficulty of constructing the basic probability assignment function by evidence theory and obtain occurrence probabilities of different danger levels of the project.

In D-S evidence theory, it is assumed that the recognition framework is:

$$\Phi = \{A, B, C\}, \tag{11}$$

where A represents a stable period, B represents a development period, in which deterrent measures need to be taken, and C represents an alarm period, in which an early warning needs to be conducted and which is in danger of destruction.

The output results of LSTM network are used as the evidence bodies. For example, as shown in Table 2, the displacement processing result is used as a first evidence, the strain field is used as a second evidence, and so on. A, B and C in the recognition framework are regarded as a fuzzy set.

A conflict coefficient k of D-S evidence theory is:

$$k = \sum\nolimits_{A \cap B \cap C \cap \ldots = \Phi} m_1(A) \cdot m_2(B) \cdot m_3(C) \ \ldots \ .$$

If the value of k is large, it means that the conflict between evidences is large, and the fusion result may not be consistent with the actual situation, resulting in wrong decision. In order to overcome the above drawbacks, the present disclosure introduces Chebyshev distance to characterize the conflict degree between evidences, and corrects conflict evidences. Chebyshev formula defines, as an infinite norm of the two evidence bodies, the distance between two evidences, which can better reflect inconsistency degree between evidences. According to concept of Chebyshev distance, distance equation of evidence bodies $m_i$ and $m_j$ is derived:

$$d_{BPA}(m_i, m_j) = \text{Cheb\_dis}(m_i, m_j) = \max|m_i - m_j|, \tag{12}$$

Where $d_{BPA}(m_i,m_j)$ and Cheb_dis($m_i$,$m_j$) both represent Chebyshev distance of two different evidence bodies; max represents calculating a maximum value and || represents calculating an absolute value.

In step 5.2, a new conflict coefficient k between evidence bodies $m_i$ and $m_j$ is calculated according to Chebyshev distance $d_{BPA}(m_i,m_j)$. A new conflict coefficient k' between evidence i and evidence j is defined as:

$$k' = \frac{d_{BPA}(m_i, m_j) + k}{2}, \tag{13}$$

In step 5.3, based on the new conflict coefficient k', the basic probability assignments m(A), m(B) and m(C) of various warning levels after fusion are obtained according to the improved D-S evidence theory based on the Chebyshev distance.

According to the improved D-S evidence theory based on the Chebyshev distance (Equ. (14)), the basic probability assignments m(j) of various warning levels in the fusion recognition framework are obtained, where j=A, B, C.

$$m(\Phi) = 0 \tag{14}$$

-continued $$m(j)=\frac{1}{1-k'}\sum_{A\cap B\cap C\cap \ldots =j} m_1(j)\cdot m_2(j)\cdot m_3(j)\ \ldots\ ,\ \forall\ j\subset\Phi,$$

The various warning levels includes a stable period, a developing period, and an alarm period; m(A), m(B) and m(C) are basic probabilities assignments in a stable period, a development period, and an alerting period, respectively. $m_1(j)$, $m_2(j)$ and $m_3(j)$ respectively represent 1st, 2nd, and 3rd output results of LSTM, that is, 1st, 2nd, and 3rd basic probability assignments of the warning level j.

In step 6, according to the basic probability assignments of various warning levels after the fusion, disaster danger levels of potentially dangerous parts of the project structure is determined by a basic probability assignment-based decision method.

In step 6, the decision method of basic probability assignment is used to evaluate a danger level of rock mass destruction.

A process of evaluating the disaster danger level using the decision method of the basic probability assignment is as follows: setting a first and second thresholds $\varepsilon_1$ and $\varepsilon_2$; if $Z_1$, $Z_2$ meet a formula (15), then $Z_1$ is a final evaluation result, that is, $Z_1$ is a disaster danger level of potential dangerous part of the project structure, where $Z_1, Z_2 \in \Phi=\{A, B, C\}$, A represents a stable period, B represents a development period, and C represents an alarm period.

$$m(Z_1)=\max\{m(j),\ j\subset\Phi\}, \tag{15}$$

$$m(Z_2)=\max\{m(j),\ j\subset\Phi,\ Z_1\neq Z_2\},\ Z_1Z_2,\ j\subset\Phi$$

$$m(Z_1)-m(Z_2)>\varepsilon_1^-,$$

$$m(\Phi)<\varepsilon_2^-,$$

$$m(Z_1)>m(\Phi),$$

Figure 4:
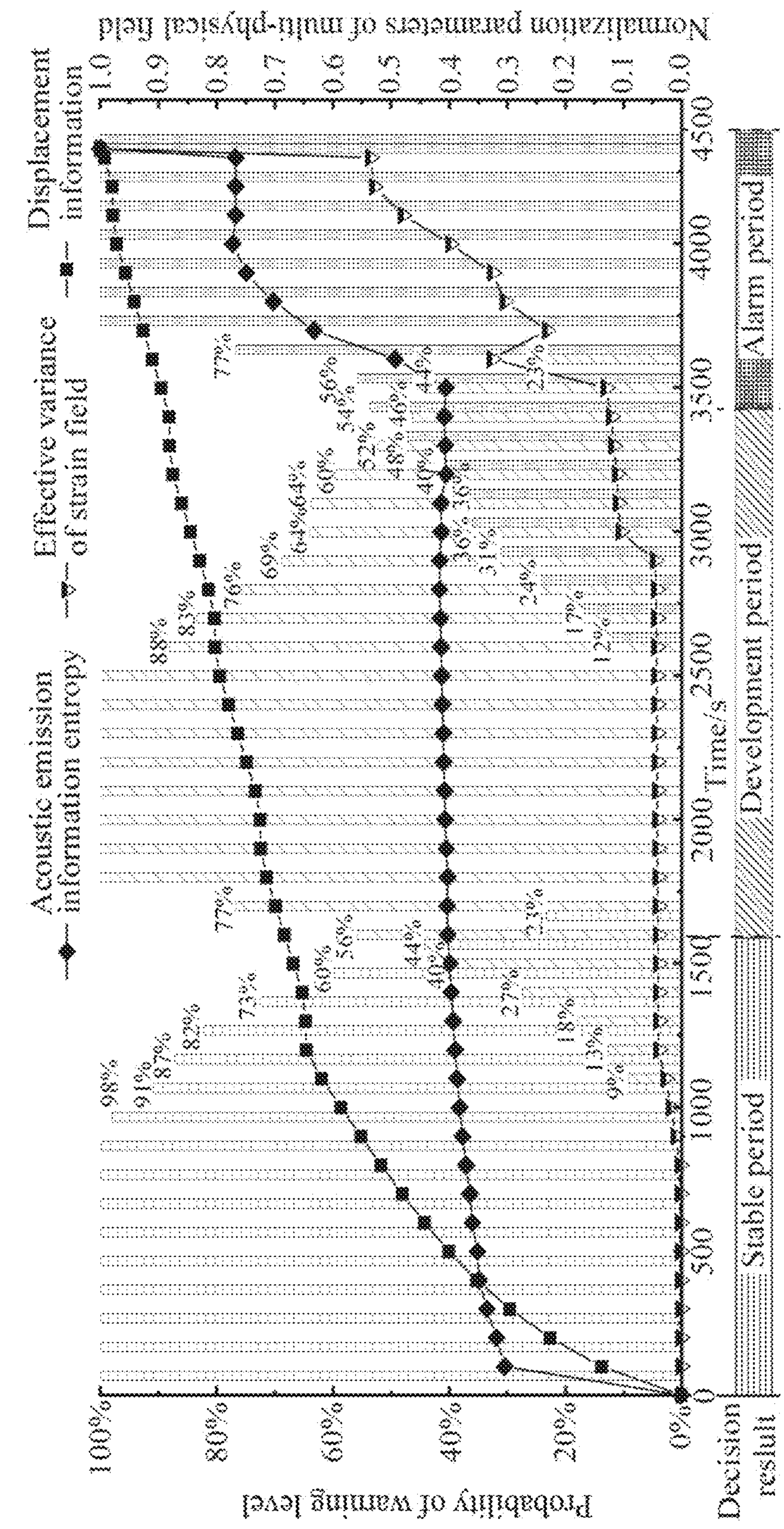
FIG. 4 is a schematic diagram of results of warning rock mass destruction based on collaborative fusion of multi-physical field monitoring data according to an embodiment of the present disclosure.

In the embodiments of the present disclosure, the basic probability assignments m(A), m(B) and m(C) are output by the above-mentioned warning method, which are probabilities that tunnel rock mass is in a stable period, a development period and a warning period, respectively. FIG. 4 shows the warning results obtained by evaluate the warning level of a tunnel through the basic probability assignment method. In FIG. 4, the evaluation results of the tunnel safety state are represented by probabilities of different risk levels, to visually show the probabilities and levels of occurrence of tunnel destruction. In FIG. 4, the left vertical axis represents the warning level probability, the right vertical axis represents the normalization parameter of the multi-physical field monitoring indicator, and the horizontal axis represents time. The numerical values of the dotted line plot are normalization parameters of various physical field monitoring indicators, the numerical values on the bar chart correspond to the probabilities of tunnel warning levels at different moments, the part below the horizontal axis are decision results from a basic probability assignment method, which sequentially correspond to a stable period, a development period and an alarm period from left to right. In this way, it can be read from FIG. 4 that, for example, at the moment 1500, the probability of the tunnel rock mass being in the stable period is 60%, and the probability of being in the development period is 40%; at the moment 3500, the probability of the tunnel rock mass being in the development period is 44%, and the probability of being in the alarm period is 56%. Thus, hierarchical warning and probabilistic warning through cooperative fusion of multi-physical field monitoring data for tunnel destruction are realized.

The present disclosure provides a project disaster warning method based on collaborative fusion of multi-physical field monitoring data, which is used for real-time monitoring, prediction and stability evaluation in the field of hydraulic projects, and mainly includes: acquiring multi-sensor real-time monitoring data to establish a multi-physical field monitoring time sequence database; analyzing sensitivity of precursor information of monitoring parameters in various physical fields to realize data-level fusion of multi-physical field; implementing feature-level fusion of multi-physical field data through multi-dimensional LSTM network to preliminarily determine safety state of project structures; implementing decision fusion of multi-physical field data through an improved D-S evidence theory based on Chebyshev distance to determine occurrence probabilities of different danger levels, and evaluating the disaster danger levels by a basic probability assignment method. Compared with the prior art, the present disclosure at least includes the following beneficial effects.

1. The evaluation indicator is multi-physical field data. By normalization processing, dimensional differences among various indicators are eliminated, so that different types of physical field data can be compared and analyzed in the same coordinate system.

2. Multivariate statistical method is used to analyze sensitivity of multi-sensor monitoring data, and risk assessment indicator system is constructed by selecting main monitoring indicators reflecting the project state.

3. Multivariate information fusion technology is introduced to realize the warning based on multivariate perception and collaborative fusion, in time-variant prediction of project, thereby breaking; limitations of single-factor discrimination and subjectivity of multi-factor comparative analysis, fully considering influence of multi-physical field parameter changes, and improving prediction accuracy.

4. The evaluation results of the safety state of the project are expressed by probabilities of different risk levels, which directly reflect the levels and probabilities of project disasters.

5. The Chebyshev Distance is introduced to characterize the conflict degree between evidences, and evidence with high conflict is corrected to improve the scientificity and correctness of fusion decision.

Based on the method according to the present disclosure, the present disclosure also provides a project disaster warning system based on collaborative fusion of multi-physical field monitoring data, comprising:

a data acquisition and preprocessing module, configured to acquire and preprocess multi-sensor real-time monitoring data of potentially dangerous parts of a project structure to obtain multi-physical field monitoring time sequence data;

a normalization processing module, configured to perform normalization processing on the multi-physical field monitoring time sequence data to construct a normalized sample matrix;

a multi-physical field data-level fusion module, configured to analyze sensitivities of various physical field monitoring indicators to a safety state of a project by using a multivariate statistical method, according to the normalized sample matrix;

a multi-physical field feature-level fusion module, configured to guide initialization training of a LSTM network according to the sensitivities of various physical field monitoring indicators to the safety state of the project, and obtain output results of the LSTM network through a trained LSTM network;

a multi-physical field data decision fusion module, configured to obtain, with the output results of the LSTM network as evidence inputs, basic probability assignments of various warning levels after fusion according to a improved D-S evidence theory based on Chebyshev distance;

a disaster danger level evaluation module, configured to determine disaster danger levels of the potentially dangerous parts of the project structure according to the basic probability assignments of various warning levels after fusion, by using a basic probability assignment-based decision method.

The data acquisition and preprocessing module specifically includes:

a data acquisition unit, configured to acquire the multi-sensor real-time monitoring data of the potentially dangerous parts of the project structure, wherein the multi-sensor real-time monitoring data is real-time monitoring data collected in time sequence by two or more of a strain sensor, a displacement sensor, a stress sensor, a wave velocity sensor, an osmotic pressure sensor, a temperature sensor, an acoustic emission sensor and an electromagnetic radiation sensor;

a data preprocessing unit configured to preprocess the multi-sensor real-time monitoring data by wavelet analysis or mean value fitting method to remove abnormal or noise data, and obtain the multi-physical field monitoring time sequence data.

The normalization processing module includes:

a sample data matrix establishment unit configured to establish a sample data matrix X* according to the multi-physical field monitoring time sequence data, wherein various data columns $X^*_i$ in the sample data matrix X* correspond to different physical field monitoring indicators i collected by respective sensors; the physical field monitoring indicators i i include strain, displacement, stress, wave velocity, osmotic pressure, temperature, acoustic emission, electromagnetic radiation;

a normalization conversion unit configured to perform normalization conversion on various data columns $X^*_i$ in the sample data matrix X* to obtain the normalized sample matrix X, wherein various data columns $X_i$ in the normalized sample matrix X correspond to respective physical field monitoring indicators i.

The multi-physical field data-level fusion module includes:

a correlation coefficient matrix calculation unit configured to calculate a correlation coefficient matrix R according to the normalized sample matrix X;

a non-negative characteristic root calculation unit configured to calculate p non-negative characteristic roots $\{\lambda_1, \lambda_2, \ldots, \lambda_p\}$ according to the correlation coefficient matrix R, wherein p is a number of physical field monitoring indicators i;

a cumulative contribution degree calculation unit configured to determine cumulative contribution degrees $W_q$ of first q common factors among p common factors according to the p non-negative characteristic roots $\{\lambda_1, \lambda_2, \ldots, \lambda_p\}$;

a main common factor selection unit configured to select main common factors $F_q$ which reflect a safety state of the project structure according to a principle that the cumulative contribution degrees $W_q$ are not less than 85%, and construct a common factor matrix F;

a factor load matrix calculation unit configured to calculate a factor load matrix A according to the common factor matrix F;

a weight calculation unit configured to calculate weights $T_i$ of various physical field monitoring indicators i in all main common factors according to the factor load matrix A;

a final weight calculation unit configured to calculate final weights $\tau_i$ of various physical field monitoring indicators i according to the cumulative contribution degrees $W_q$ and the weights $T_i$ corresponding to various physical field monitoring indicators i, wherein the final weights $\tau_i$ reflect the sensitivities of various physical field monitoring indicators i to the safety state of the project.

The method and system of the present disclosure perform sensitivity analysis on the multivariate monitoring parameters for project destruction based on the multivariate statistical method, select main monitoring information reflecting the safety state of the project to construct a risk assessment indicator system, and avoid impact of redundant and overlapping information among the multivariate monitoring data on the project safety risk evaluation. The multi-dimensional LSTM network is constructed to extract and identify features of multi-physical field data, and the basic probability assignment of each evidence body is obtained, thereby overcoming difficulty of constructing a basic probability assignment function by evidence theory. The improved D-S evidence theory based on Chebyshev distance is adopted to solve problem of decision error caused by high conflict evidences, and multiple evidence bodies are fused to make decisions, thereby overcoming problem of inconsistency in the warning time of a single response indicator. With the above implementation process of the method and system of the present disclosure, the main monitoring parameters of multiple sensors that reflect the safety state of the project can be selected, so as to realize probabilistic warning and hierarchical warning for project disaster based on collaborative fusion of multivariate monitoring data, while allow intelligent perception and collaborative fusion of multivariate service monitoring information, feature extraction and identification of multi-dimensional performance data, full-time service fusion and time-variant prediction, which significantly improves accuracy of project disaster warning.

For the system disclosed in the embodiment, since it corresponds to the method disclosed in the embodiment, the description is relatively simple, and the description of the method can be referred to. For the system disclosed in the embodiment, since it corresponds to the method disclosed in the embodiment, the description is relatively simple, and the description of the method can be referred to.

In this specification, specific examples are used to illustrate principles and implementations of the present disclosure. The descriptions of the above embodiments are only used to help understand the method and core concept of the present disclosure. In addition, for those skilled in the art, according to the concept of the present disclosure, there will be changes in the specific implementation and application scope. In conclusion, the contents of this specification should not be construed as limiting the present disclosure.

What is claimed is:

1. A project disaster warning method based on collaborative fusion of multi-physical field monitoring data, comprising:

acquiring and preprocessing multi-sensor real-time monitoring data of potentially dangerous parts of a project structure to obtain multi-physical field monitoring time sequence data;

performing normalization processing on the multi-physical field monitoring time sequence data to construct a normalized sample matrix;

analyzing sensitivities of various physical field monitoring indicators to a safety state of a project according to the normalized sample matrix, by using a multivariate statistical method;

guiding initialization training of a long short-term memory (LSTM) network according to the sensitivities of various physical field monitoring indicators to the safety state of the project, and obtaining output results of the LSTM network through a trained LSTM network;

obtaining basic probability assignments of various warning levels after fusion according to an improved D-S evidence theory based on Chebyshev distance-based, with the output results of the LSTM network as evidence inputs;

determining disaster danger levels of the potentially dangerous parts of the project structure according to the basic probability assignments of various warning levels after fusion, by using a basic probability assignment-based decision method; and giving an alarm, based on the determined disaster danger levels of the potentially dangerous parts of the project structure.

2. The method according to claim 1, wherein the acquiring and preprocessing multi-sensor real-time monitoring data of potentially dangerous parts of a project structure to obtain multi-physical field monitoring time sequence data comprises:

acquiring the multi-sensor real-time monitoring data of the potentially dangerous parts of the project structure, wherein the multi-sensor real-time monitoring data is real-time monitoring data collected in time sequence by two or more of a strain sensor, a displacement sensor, a stress sensor, a wave velocity sensor, an osmotic pressure sensor, a temperature sensor, an acoustic emission sensor and an electromagnetic radiation sensor;

preprocessing the multi-sensor real-time monitoring data by wavelet analysis or mean value fitting method to remove abnormal or noise data and obtain the multi-physical field monitoring time sequence data.

3. The method according to claim 2, wherein the performing normalization processing on the multi-physical field monitoring time sequence data to construct a normalized sample matrix comprises:

establishing a sample data matrix X* according to the multi-physical field monitoring time sequence data, wherein various data columns $X^*_i$ in the sample data matrix X* correspond to different physical field monitoring indicators i collected by different sensors; the physical field monitoring indicators i comprise strain, displacement, stress, wave velocity, osmotic pressure, temperature, acoustic emission, electromagnetic radiation;

performing normalization conversion on various data columns $X^*_i$ in the sample data matrix X* to obtain a normalized sample matrix X, wherein various data columns $X^*_i$ in the normalized sample matrix X correspond to different physical field monitoring indicators i.

4. The method according to claim 3, wherein the analyzing sensitivities of various physical field monitoring indicators to a safety state of a project according to the normalized sample matrix, by using a multivariate statistical method, comprises:

calculating a correlation coefficient matrix R according to the normalized sample matrix X;

calculating p non-negative characteristic roots $\{\lambda_1, \lambda_{12}, \ldots, \lambda_p\}$ according to the correlation coefficient matrix R, wherein p is a number of physical field monitoring indicators i;

determining cumulative contribution degrees $W_q$ of first q common factors among p common factors according to the p non-negative characteristic roots $\{\lambda_1, \lambda_2, \ldots, \lambda_p\}$;

selecting main common factors $F_q$ which reflect a safety state of the project structure according to a principle that the cumulative contribution degrees $W_q$ are not less than 85%, and constructing a common factor matrix F;

calculating a factor load matrix A according to the common factor matrix F;

calculating weights $T_i$ of various physical field monitoring indicators i in all main common factors according to the factor load matrix A;

calculating final weights $\tau_i$ of various physical field monitoring indicators i according to the cumulative contribution degrees $W_q$ and the weights $T_i$ corresponding to various physical field monitoring indicators i, wherein the final weights $\tau_i$ reflect the sensitivities of various physical field monitoring indicators i to the safety state of the project.

5. The according to claim 4, wherein the guiding initialization training of a LSTM network according to the sensitivities of various physical field monitoring indicators to the safety state of the project, and obtaining output results of the LSTM network through a trained LSTM network comprises:

training the LSTM network with the sensitivities $\tau_i$ of various physical field monitoring indicators i to the safety state of the project as initialization weights of the LSTM network and the normalized sample matrix corresponding to various physical field monitoring indicators i as a sample set, by using a sigmoid function as a network activation function, to obtain the trained LSTM network;

performing feature-level fusion through the trained LSTM network to obtain the output results of the LSTM network.

6. The method according to claim 5, wherein the obtaining basic probability assignments of various warning levels after fusion according to an improved D-S evidence theory based on Chebyshev distance, with the output results of the LSTM network as evidence inputs, comprises:

calculating, with the output results of the LSTM network as basic probability assignments of warning levels of various evidence bodies, a Chebyshev distance $d_{BPA}(m_i,m_j)$ between an evidence body $m_i$ and an evidence body $m_j$;

calculating a new conflict coefficient k' between the evidence body $m_i$ and the evidence body $m_j$ according to the Chebyshev distance $d_{BPA}(m_i,m_j)$;

obtaining basic probability assignments m(A), m(B) and m(C) of various warning levels after fusion based on the new conflict coefficient k', according to the improved D-S evidence theory based on the Chebyshev distance, wherein the various warning levels comprise a stable period, a development period and an alarm period; m(A), m(B) and m(C) are basic probability assignments in the stable period, the development period and the alarm period, respectively.

7. A project disaster warning system based on collaborative fusion of multi-physical field monitoring data, comprising:

a data acquisition and preprocessing module, configured to acquire and preprocess multi-sensor real-time monitoring data of potentially dangerous parts of a project structure to obtain multi-physical field monitoring time sequence data;

a normalization processing module, configured to perform normalization processing on the multi-physical field monitoring time sequence data to construct a normalized sample matrix;

a multi-physical field data-level fusion module, configured to analyze sensitivities of various physical field monitoring indicators to a safety state of a project according to the normalized sample matrix, by using a multivariate statistical method;

a multi-physical field feature-level fusion module, configured to guiding initialization training of a LSTM network according to the sensitivities of various physical field monitoring indicators to the safety state of the project, and obtain output results of the LSTM network through a trained LSTM network;

a multi-physical field data decision fusion module, configured to obtain basic probability assignments of various warning levels after fusion according to an improved D-S evidence theory based on Chebyshev distance, with the output results of the LSTM network as evidence inputs;

a disaster danger level evaluation module, configured to determine disaster danger levels of the potentially dangerous parts of the project structure according to the basic probability assignments of various warning levels after fusion, by using a basic probability assignment-based decision method;

wherein, the project disaster warning system is further configured to give an alarm, based on the determined disaster danger levels of the potentially dangerous parts of the project structure.

8. The system according to claim 7, wherein the data acquisition and preprocessing module comprises:

a data acquisition unit, configured to acquire the multi-sensor real-time monitoring data of the potentially dangerous parts of the project structure, wherein the multi-sensor real-time monitoring data is real-time monitoring data collected in time sequence by two or more of a strain sensor, a displacement sensor, a stress sensor, a wave velocity sensor, an osmotic pressure sensor, a temperature sensor, an acoustic emission sensor and an electromagnetic radiation sensor;

a data preprocessing unit, configured to preprocess the multi-sensor real-time monitoring data by wavelet analysis or mean value fitting method to remove abnormal or noise data and obtain the multi-physical field monitoring time sequence data.

9. The system according to claim 8, wherein the normalization processing module comprises:

a sample data matrix establishment unit, configured to establish a sample data matrix X* according to the multi-physical field monitoring time sequence data, wherein various data columns $X^*_i$ in the sample data matrix X* correspond to different physical field monitoring indicators i collected by different sensors; the physical field monitoring indicators i comprises train, displacement, stress, wave velocity, osmotic pressure, temperature, acoustic emission, electromagnetic radiation;

a normalization conversion unit, configured to perform normalization conversion on various data columns $X^*_i$ in the sample data matrix X* to obtain the normalized sample matrix X, wherein various data columns $X_i$ in the normalized sample matrix X correspond to various physical field monitoring indicators i.

10. The system according to claim 9, wherein the multi-physical field data-level fusion module comprises:

a correlation coefficient matrix calculation unit, configured to calculate a correlation coefficient matrix R according to the normalized sample matrix X;

a non-negative characteristic root calculation unit, configured to calculate p non-negative characteristic roots $\{\lambda_1, \lambda_2, \ldots, \lambda_p\}$ according to the correlation coefficient matrix R, wherein p is a number of physical field monitoring indicators i;

a cumulative contribution degree calculation unit, configured to determine cumulative contribution degrees $W_q$ of first q common factors among p common factors according to the p non-negative characteristic roots $\{\lambda_1, \lambda_2, \ldots, \lambda_p\}$;

a main common factor selection unit, configured to select main common factors $F_q$ which reflect a safety state of the project structure according to a principle that the cumulative contribution degrees $W_q$ are not less than 85%, and construct a common factor matrix F;

a factor load matrix calculation unit, configured to calculate a factor load matrix A according to the common factor matrix F;

a weight calculation unit, configured to calculate weights $T_i$ of various physical field monitoring indicators i in all main common factors according to the factor load matrix A;

a final weight calculation unit, configured to calculate final weights $\tau_i$ of various physical field monitoring indicators i according to the cumulative contribution degrees $W_q$ and the weights $T_i$ corresponding to various physical field monitoring indicators i, wherein the final weights $\tau_i$ reflect the sensitivities of various physical field monitoring indicators i to the safety state of the project.

* * * * *